(12) United States Patent
Hamberg

(10) Patent No.: US 7,571,469 B2
(45) Date of Patent: Aug. 4, 2009

(54) METHOD FOR COMMUNICATION CONTROL IN A COMMUNICATION NETWORK, COMMUNICATION CONTROL ENTITY, KEY MANAGEMENT ENTITY, TERMINAL AND GATEWAY ENTITY

(75) Inventor: Max Hamberg, Vantaa (FI)

(73) Assignee: Nokia Corporation, Espoo (FI)

( * ) Notice: Subject to any disclaimer, the term of this patent is extended or adjusted under 35 U.S.C. 154(b) by 826 days.

(21) Appl. No.: 10/411,362

(22) Filed: Apr. 11, 2003

(65) Prior Publication Data

US 2004/0120526 A1 Jun. 24, 2004

Related U.S. Application Data

(60) Provisional application No. 60/435,872, filed on Dec. 24, 2002.

(51) Int. Cl.
*H04L 9/00* (2006.01)
*H04L 9/32* (2006.01)

(52) U.S. Cl. .............................. 726/10; 726/3; 380/277

(58) Field of Classification Search .................... 726/3, 726/4, 10; 713/171; 380/277
See application file for complete search history.

(56) References Cited

U.S. PATENT DOCUMENTS 6,310,538 B1 * 10/2001 Boucher ........................ 726/2

6,338,140 B1 * 1/2002 Owens et al. ................... 726/5

FOREIGN PATENT DOCUMENTS

EP 1 178 644 A 2/2002
WO WO 00/74345 A1 12/2000

OTHER PUBLICATIONS

Fully-fledged two-way public key authentication and key agreement for low-cost terminals Beller, M.J.; Yacobi, Y.; Electronic Letters vol. 29, Issue 11, May 27, 1993 pp. 999-1001.*
The private key capacity region for three terminals Ye, C.; Narayan, P.; Information Theory, 2004. ISIT 2004. Proceedings. International Symposium on Jun. 27-Jul. 2, 2004 p. 46.*
Secrecy capacities for multiple terminals Csiszar, I.; Narayan, P.; Information Theory, IEEE Transactions on vol. 50, Issue 12, Dec. 2004 pp. 3047-3061.*
http://www.mobiletv.nokia.cim/solutions/mbs/files/ipdc22_service_protection.pdf, as printed in year 2007.*
http://news.zdnet.co.uk/security/o,1000000189,2084560,00.htm, as printed in year 2007.*

(Continued)

*Primary Examiner*—David Y Jung
(74) *Attorney, Agent, or Firm*—Squire, Sanders & Dempsey L.L.P.

(57) ABSTRACT

A terminal for controlling communication can include a receiving unit configured to receive a key to be assigned to a requesting terminal for communication, a processing unit configured to include an indication of assigned communication keys, and a transmission unit configured to transmit the communication request to a communication control functionality.

47 Claims, 1 Drawing Sheet

OTHER PUBLICATIONS http://www.w3.org/2000/12/drm-ws/pp/cloakware.html, year 2000.*

W. Kellerer, P. Sites, and J. Eberspacher "IP Based Enhanced Data Casting Services Over Radio Broadcast Networks," Proc. IEEE ECUMN, Colmar, France, Oct. 2000, pp. 195--203.*

The sharing session key component (SSKC) algorithm for end-to-end secure wireless communication Hsiao-Kuang Wu; Shu-Ching Yang; Yung-Tai Lin; Security Technology, 2000. Proceedings. IEEE 34th Annual 2000 International Carnahan Conference on Oct. 23-25, 2000 pp. 242 - 250.*

A secure and efficient conference scheme for mobile communications Xun YI; Chee Kheong Siew; CHik How Tan; Vehicular Technology, IEEE Transactions on vol. 52, Issue 4, Jul. 2003 pp. 784 - 793.*

An Effiecient Mobile Authentication Scheme for Wireless Networks Caimu Tang; Wu, D.O.; Wireless Communication, IEEE Transactions on vol. 7, Issue 4, Apr. 2008 pp. 1408 - 1416.*

Haverinen, H. et al.; *"Cellular Access Control and Charging for Mobile Operator Wireless Local Area Networks"*, XP-001143468, IEEE Wireless Communications, Dec. 2002.

Digital Rights Management and Superdistribution of Mobile Content, Nokia, 2001, pp. 2-7.

* cited by examiner

METHOD FOR COMMUNICATION CONTROL IN A COMMUNICATION NETWORK, COMMUNICATION CONTROL ENTITY, KEY MANAGEMENT ENTITY, TERMINAL AND GATEWAY ENTITY

CROSS REFERENCE TO RELATED APPLICATIONS:

This application claims priority of U.S. Provisional Patent Application Ser. No. 60/435,872, entitled "Method for Communication Control in a Communication Network, Communication Control Entity, Key Management Entity, Terminal, and Gateway Entity," filed on Dec. 24, 2002, the contents of which are hereby incorporated by reference.

BACKGROUND OF THE INVENTION

Field of the Invention

The present invention relates to a method for communication control in a communication network, a correspondingly adapted communication control entity, key management entity, terminal and gateway entity.

Recently, mobile communication networks have widely spread and increasingly found attention. In the near future, mobile communication networks will be more and more based on the Internet protocol (IP) so that users may access the Internet by means of the terminals and/or mobile stations MS, exchange data with the Internet or other subscriber terminals, e.g. via the Internet or via IP based networks.

However, even though the subsequent description focuses to a certain extent on IP based networks, the present invention as being subsequently outlined does not require an IP based network to be carried out but may work also with non-IP based networks.

Charging and billing for services offered and used by subscribers in an IP based network are challenging issues, because terminals are intelligent, and end-users are probably able to create their own applications and evade the charging and billing of the network operator (or service provider).

Charging is also problematic in IP based networks because the network is not reliable. This means that as data are transmitted in units of packets such as TCP/IP packets (TCP=Transmission Control Protocol, IP=Internet Protocol), those data packets are often transmitted as "best effort" traffic (even if different qualities of service QoS can be agreed on for such best effort traffic).

If a network operator plans to have charging based on an amount of transmitted data, the IP frame re-sendings, i.e. retransmission of TCP/IP data packets which could not be delivered successfully at the first attempt, in the network can cause more chargeable data than the end-user is able to see. Namely, the subscriber as an end user merely perceives the data necessary for running the application, while retransmissions are transparent to the subscriber.

In future networks, the billing of content (not only data amount but also of "what" is represented by the data) will increase in significance, and also the copyright of the content has to be ensured. To this end, a digital rights management (DRM) system has recently been introduced. DRM systems interact with clearing houses to be able to charge the end-user for the content he used/transmitted.

DRM systems have also been conceived to be used in connection with mobile communication, e.g. for distribution of ringing tones and/or so-called "logos" and/or games to be run as an application on the subscribers' terminals. One such approach is outlined in "Digital Rights Management and Superdistribution of Mobile Content", White Paper, Nokia, 2001, retrieved on Aug. 22, 2002 from the Internet, i.e. http://www.nokia.com/networks/systems_and_solutions/solution-_main/1,23797,423,00.html.

With current solutions, subscribers as well as operators are facing problems such that subscribers may evade the charging and billing of the network operator/service provider; this is not satisfactory for the operator/provider; subscribers may have to pay for retransmitted data packets which they never perceived to have been retransmitted; this is not satisfactory for the subscriber; different billing systems could have to be implemented, e.g. for voice calls or for data transmissions; this is inconvenient for the operator and increases his operational expenses for running the network, while the operator's operational expenses represent already a big portion of operator costs. (It is to be noted that "data" as used herein may also be referred to as "content", i.e. a payload of data of a specific application for example.)

SUMMARY OF THE INVENTION

Consequently, it is an object of the present invention to provide an improved method for communication control in a communication network, a correspondingly adapted communication control functionality, key management entity, terminal and gateway entity, which remove the above outlined drawbacks.

According to the present invention, the above object is for example achieved by a method for communication control in a communication network between a terminal originating communication and a communication destination, the communication network comprising at least one communication control functionality, and a communication key management entity the method comprising the steps of: requesting communication by said terminal, determining at said at least one communication control functionality whether said communication request contains a valid communication key for communication in said network, and if no such valid key is contained, obtaining at least one valid key from said communication key management entity to be assigned to said requesting terminal for communication, performing communication of said requesting terminal to the communication destination using said communication key.

According to favorable further developments of the method said communication key comprises a pair of keys consisting of an encryption key for transmitting data as encrypted data and a decryption key for decrypting received encrypted data; said communication key has a predetermined expiry; said communication key expires after a predetermined amount of data has been transmitted or received; said communication key expires after a predetermined lifetime, the lifetime of the key being counted from the time of assigning it to the requesting terminal for use; said communication key expires either after a predetermined amount of data has been transmitted or received, or after a predetermined lifetime; the communication key expires only after a predetermined amount of data has been transmitted or received, and after a predetermined lifetime; the communication key obtained depends on a type of communication requested; types of communication are distinguished according to their quality of service QoS parameters; said decryption key for decrypting received encrypted data is forwarded to said destination; the method further comprising the steps of recording the communication keys assigned to the requesting terminal at said communication key management entity, and forwarding the record to a billing entity, and billing the requesting terminal based on a usage of the assigned keys; transmitted data are only partly encrypted; after said requesting and prior to said determining there is a further step of checking whether said request is a valid request, and if said request is a valid one, enabling communication.

According to the present invention, the above object is for example also achieved by a communication control functionality, comprising receiving means adapted to receive a communication request from a terminal, determination means adapted to determine whether said communication request contains a valid communication key for communication in said network, obtaining means responsive to said detection and adapted to obtain at least one valid key from a communication key management entity to be assigned to said requesting terminal for communication, if no such valid key is determined to be contained, and communication means adapted to perform communication of said requesting terminal with the communication destination using said communication key.

According to favorable further developments of said communication control entity, it further comprises key forwarding means adapted to forward said obtained encryption key and said decryption key to said terminal; said key forwarding means is adapted to forward at least the decryption key to the destination; it further comprises a checking means adapted to check whether said request is a valid request and to enable communication if said request is a valid one.

According to the present invention, the above object is for example also achieved by a key management entity for a communication network, comprising a first interface, interfacing to a communication control functionality connectable thereto, the first interface being adapted to receive, as an input from a communication control functionality, a key obtaining request for obtaining at least one valid key from the communication key management entity, and to transmit, as an output to a communication control functionality, said at least one valid key, and a second interface, interfacing to a billing entity connectable thereto, the second interface being adapted to transmit, as an output to a billing entity, a record comprising at least the requesting terminal's identification, assigned communication keys, and usage parameters of said keys.

According to the present invention, the above object is for example also achieved by a terminal, comprising receiving means adapted to receive a key assigned to said requesting terminal for communication, processing means adapted to include, into a request for communication, an indication of assigned communication keys, and transmission means adapted to transmit said request for communication to a communication control functionality of a communication network.

According to favorable further developments, said terminal further comprises a communication means adapted to perform bidirectional communication with a destination, wherein said communication means is adapted to use an encryption key for sending and a decryption key for receiving of communication data to and from said destination.

According to the present invention, the above object is for example also achieved by a gateway entity of a communication network constituting an interface to another network, said gateway entity comprising receiving means adapted to receive a key assigned to a requesting terminal for communication, a communication means adapted to perform bidirectional communication with a destination, wherein said communication means is adapted to use an encryption key for sending and a decryption key for receiving of communication data to and from said requesting terminal, and a relaying means for relaying said communication data in a non-encrypted format to and from a destination located in said another network.

By virtue of the present invention, Basically the following advantages can be achieved, subscribers may no longer evade the charging and billing of the network operator/service provider; this is satisfactory for the operator/provider; subscribers may no longer have to pay for retransmitted data packets which they never perceived to have been retransmitted; this is satisfactory for the subscriber; different billing systems do not have to be implemented, e.g. for voice calls or for data transmissions; this is convenient for the operator and decreases his operational expenses for running the network.

Thus, stated in other words, according to the present invention, a DRM system is used to "enable" e.g. the radio connection from the terminal to network or between terminals for a meaningful use (i.e. without a valid key or pair of keys, communicated data represent mere "non-sense" as no decryption is possible). Nevertheless, the same may be achieved for a non-radio connection (e.g. wired connection or infrared connection) as the functionality could also be included in an Ethernet card or the like of a personal computer as a terminal device. All the data in radio interface (or whatever transmission medium used) is encoded with a key which is derived from DRM system. DRM system keeps tracks about the keys delivered to a user and can so provide data for billing purposes. There can be different keys for different purposes (e.g. valid for a certain amount of time, valid for a certain amount of data, with different QoS—capabilities, etc.).

In contrast to calculating data amounts in many places as it is done e.g. in GPRS networks, where traditionally charging is fully based on an assumption that there is an intelligence (e.g. a somewhat centralized entity) in the network which is always needed in connection establishment, the present invention enables charging with intelligent terminals while reducing operator billing operational expenses, and the network induced retransmissions do not cause any extra costs to the end-user.

BRIEF DESCRIPTION OF THE DRAWING

In the following, the present invention will be described in greater detail with reference to the accompanying drawing, in which The FIGURE shows an example of an IP based network and entities/functionalities involved in the method according to the present invention.

DETAILED DESCRIPTION OF THE EMBODIMENTS

Embodiment I

Figure 1:
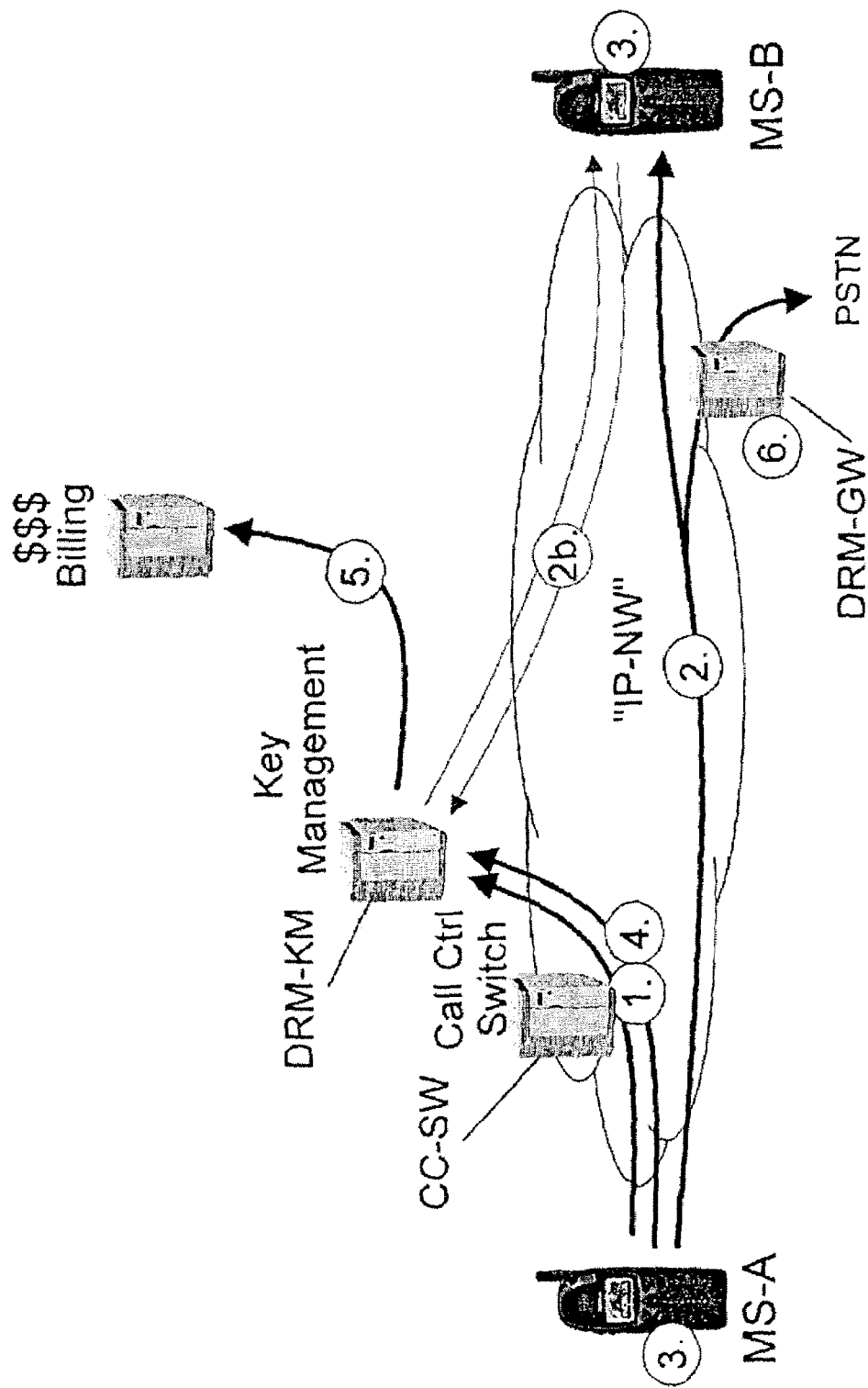

A first embodiment of the present invention will now be described with reference to the FIGURE.

The FIGURE shows a sketch of an IP based communication network and entities/functionalities involved in the method according to the present invention. Arrows in the FIGURE represent signaling/data transmitted between the entities/functionalities. Arrows are denoted by numerals representing a stage and/or step of the method. It is to be noted that a stage of the method may be composed of plural individual steps which are not indicated individually in order to keep the illustration easy for perception. Also, only those entities/functionalities are shown which are involved in the method. Thus, the network may of course comprise more entities involved in properly running the network, while these are not shown in the FIGURE.

Subsequently, the entities/functionalities will be described.

As shown in the FIGURE, terminals MS-A and MS-B are present. For the subsequent explanation, MS-A is assumed to be a communication requesting (originating) terminal, while MS-B is assumed to represent a destination for communication. Nevertheless, the situation may also be vice versa. In addition, communication may be requested from e.g. MS-A to a destination (not shown) located in another network (such as a PSTN (Public Switched Telephone Network); in such a case, communication will be accomplished via a gateway DRM-GW (to be explained later). Furthermore, a call control switch CC-SW, a DRM key management entity DRM-KM, and a billing server denoted by "$$$" is involved in carrying out the method according to the present invention. The terminals MS-A, MS-B may be any terminal such as a mobile station but also a personal computer connected to a network. Also, the call control switch, basically, represents an access control element such as a session control server, or, more generally, a communication control entity. Also, a router may represent a communication control entity, e.g. in a LAN or WLAN environment.

It is to be noted that the reference to a communication control entity rather has to be understood as a reference to a communication control functionality. The functionality need not be implemented as a separate entity as shown in the FIGURE in connection with the first embodiment. Rather, the communication control functionality also reside in the terminal itself, as briefly to be explained in connection with the second embodiment later on. Thus, the communication control functionality need not necessarily be a call control switch CC-SW, but may equally well be a communication control software installed at the terminal, e.g. MS-A.

Though not shown in their particular individual internal constitution, it is to be noted that each of the terminals MS-A, MS-B comprises receiving means which are adapted to receive a key assigned to said terminal upon requesting for communication, processing means which are adapted to include, into a request for communication, an indication of assigned communication keys, and transmission means which are adapted to transmit said request for communication (including the assigned key) to a communication control functionality. The functionality may, if included in a call control switch, be part of the communication network. If the communication control functionality is, however, installed at the terminal, then it cooperates only with the communication network, but does not represent a part of the network as such. The terminals further comprise communication means which are adapted to perform bidirectional communication with a destination, wherein said communication means is adapted to use an encryption key for sending and a decryption key for receiving of communication data to and from said destination. It is to be noted that the communication means may also be operated in a unidirectional communication mode only, i.e. for transmission only or reception only, if required.

Furthermore, as regards the communication control functionality represented in FIG. 1 as a call control switch CC-SW as an example, this functional entity comprises receiving means adapted to receive a communication request from a terminal (e.g. MS-A), determination means adapted to determine whether said communication request contains a valid communication key for communication in said network, obtaining means responsive to said detection and adapted to obtain at least one valid key from a communication key management entity to be assigned to said requesting terminal for communication, if no such valid key is determined to be contained, and communication control means adapted to enable communication of said requesting terminal MS-A with the communication destination, e.g. MS-B, using said assigned communication key. The communication control functionality further comprises key forwarding means adapted to forward said obtained encryption key and said decryption key to said (requesting) terminal. Also, the communication control entity, more precisely, its key forwarding means, is adapted to forward at least the decryption key to the destination. Nevertheless, the decryption key may, once obtained, also be forwarded from the requesting terminal to the destination. Note that the same internal functional behavior will apply for the communication control functionality if installed at the terminal, while any involved signaling/processing will remain internally in the terminal and not "visible" in the network as such.

The key management entity DRM-KM of the communication network comprises a first interface, interfacing the communication control entity connectable thereto, the first interface being adapted to receive, as an input from the communication control entity, a key obtaining request for obtaining at least one valid key from the communication key management functionality, and to transmit, as an output to the communication control functionality, said at least one valid key, and a second interface, interfacing to a billing entity connectable thereto, the second interface being adapted to transmit, as an output to a billing entity, a record comprising at least the requesting terminal's identification, assigned communication keys, and usage parameters of said keys.

Furthermore, the gateway entity of the communication network constituting an interface to another network (such as a PSTN) comprises receiving means adapted to receive a key assigned to a requesting terminal for communication, a communication means adapted to perform bidirectional communication with a destination, wherein said communication means is adapted to use an encryption key for sending and a decryption key for receiving of communication data to and from said requesting terminal, and a relaying means for relaying said communication data in a non-encrypted format to and from a destination (not shown) located in said another network (not shown).

With the entities having been described so far, the method will subsequently be described in greater detail with reference to FIG. 1 and the stages/steps 1 through 6.

Stage 1):

MS-A as a requesting terminal starts a call to MS-B as a destination. Before the call can be established, the call control entity CC-SW, or more generally the communication control functionality, requests an encryption-decryption key pair from key management. Key management entity DRM-KM stores information about the key and the use case for billing purposes. Keys can be valid for a certain time, or for a certain amount of data or for a certain amount of transactions, etc., as will be set out in greater detail herein below.

Stated in other words, MS-A requests communication, CC-SW determines whether said communication request contains a valid communication key for communication in said network, and if no such valid key is contained, CC-SW obtains at least one valid key from said communication key management entity DRM-KM to be assigned to said requesting terminal MS-A for communication, whereafter there is performed communication of said requesting terminal MS-A to the communication destination (e.g. MS-B) using said assigned or previously already present communication key. (Communication is insofar enabled as, when performed using the keys, the communication partners can perform a "meaningful" communication as both can encrypt/decrypt the messages for/from the respective other one. Without a key, communication would be "nonsense".)

In this connection, it has to be noted that transmitted data may also be only partly encrypted, for example, only every second or third frame of data transmitted by the terminal is encrypted. This reduces the required processing while anyway the receiving side cannot read the data without the corresponding decryption key.

It is further to be noted that based on the request (valid request or not) it is checked whether communication can be enabled, i.e. whether a connection can be established at all or not. This could be accomplished using a signaling as it is currently known in various scenarios such as GSM networks. Furthermore, based on a valid communication key (contained in the (valid) request or retrieved from the key management entity) communication is performed.

Stage 2):

MS-A sends the decryption key to MS-B (or to the gateway DRM-GW if the destination is a terminal in another network such as e.g. a PSTN network). Alternatively, the decryption key can be sent to the destination already by the CC-SW entity/functionality. Also, the decryption key can be chargeable if needed; in such a case B contacts to Key Management entity DRM-KM, too (stage/step 2b).

Stage 3):

All the data (e.g. voice stream or multimedia message) between terminals is encrypted/decrypted with the keys-valid for a certain period of time or for a certain amount of data, etc.

More precisely, said communication key comprises a pair of keys consisting of an encryption key for transmitting data as encrypted data and a decryption key for decrypting received encrypted data, and a respective communication key has a predetermined expiry. The expiry can but need not be defined differently for an encryption key and a decryption key.

For example, said communication key expires after a predetermined amount of data has been transmitted or received, or said communication key expires after a predetermined lifetime, the lifetime of the key being counted from the time of assigning it to the requesting terminal for use.

Also, said communication key may be defined to expire either after a predetermined amount of data has been transmitted or received, or after a predetermined lifetime.

Also, said communication key may be defined to expire only after a predetermined amount of data has been transmitted or received, and after a predetermined lifetime.

Still further, said communication key obtained depends on a type of communication requested, with types of communication being distinguished according to their quality of service QoS parameters.

Stage 4):

When a key expires, MS-A (or MS-B) can request a new one. This implies of course that an entity using an encryption/decryption key "knows" and/or monitors the expiry of the respective key currently used.

If a new key is not requested while the old one nevertheless expires, then the connection established could become "noise", i.e. due to encryption/decryption being no longer enabled, the "data" transmitted on the connection can no longer be listened to but the data appear as noise to a listening terminal (and makes no longer any sense, i.e. is "nonsense" as the recipient does not longer understand it due to its lack of decryption capability because of no valid (decryption) key).

In such a case, the connection could still be maintained, optionally, it could however also be released (e.g. immediately upon expiry of the old key if no new key is requested, or after a predetermined period of time, for which there occurred merely noise on the connection, or dependent on any other criteria).

Stage 5):

Key management entity DRM-KM sends usage data to billing entity. The same billing can be used as with any content paying. Stated in other words, a recording of the communication keys assigned to the requesting terminal at said communication key management entity DRM-KM is effected, and the corresponding record is forwarded to a billing entity, so that billing the requesting terminal MS-A is based on a usage of the assigned keys.

Stage 6):

In another scenario, MS-A calls a "simple" terminal (e.g. PSTN terminal). In this case the call and/or communication is routed via the DRM gateway DRM-GW, which decrypts the flow. The gateway acts a relaying entity between the requesting terminal MS-A and the destination (not shown) in the PSTN network. Communication between the DRM-GW and the terminal MS-A is encrypted/decrypted, while communication between DRM-GW and the PSTN terminal (not shown) happens "as usual", i.e. non-encrypted.

Similarly, in case a PSTN terminal requests communication to e.g. MS-A, then the gateway is adapted to exhibit terminal properties in that way that the gateway DRM-GW requests communication, CC-SW determines whether said communication request contains a valid communication key for communication in said network, and if no such valid key is contained, CC-SW obtains at least one valid key from said communication key management entity DRM-KM to be assigned to said requesting "terminal" DRM-GW for communication, whereafter there is performed communication of said requesting "terminal" DRM-GW to the communication destination (e.g. MS-A) using said assigned communication key.

Embodiment II

Embodiment I as described herein above was mainly described with a reference to a communication network having a "centralized" intelligence where the communication control functionality was implemented in a network entity such as the call control switch. Such a network architecture is commonly known for e.g. cellular communication networks.

For the second embodiment, a non-cellular communication network but rather a so-called ad-hoc network is now briefly considered. Such networks may rely on using a LAN or WLAN for interconnection between terminals and thus have no cellular structure.

More precisely, consider that there is free frequency and a WLAN connection (i.e. not a cellular connection). For example in following situation, then the communication control functionality is not a separate entity but installed at the terminal.

A certain company (e.g. Nokia/ . . . ) provides for example a terminal known as "game station" or more generally a Multimedia Terminal enabled with WLAN access to families. The same company also provides end user terminals (e.g. phones/PDA's/ . . . ) able to communicate with the game stations over WLAN. The game stations are connected to each others over WLAN/LAN. Because an increasing number of families has or will in future have such a game station, the WLAN covering will be present in large areas of the city.

Now, people can make calls/any connections with their terminals in a way, that they perhaps already know the IP address of the terminating party, and start to send IP data from terminal over WLAN to the nearest gamestation which acts as a router and routes the IP frames to the next gamestation over WLAN (or over perhaps even LAN) and finally to the gamestation nearby the terminating terminal. Then, there is no centralized access control in network. However, it might be in the company's interest to charge for this kind of "ad-hoc network" connections: all the traffic from a terminal over WLAN is encrypted, and can be utilized only if having the DRM enabled pair of en-/decryption keys. So, a communication control entity CC-SW as such is not necessarily needed, but the communication control functionality can be implemented to the terminal.

In such a scenario as assumed for the second embodiment, the network does not need an access control level intelligence for charging. Rather, charging can be accomplished with the present invention being implemented. A terminal may approach the DRM system at a predetermined IP address, for example by using a predetermined key.

Also, for example, a terminal A may send a message to the IP address of a DRM system by broadcasting it over WLAN. Terminals D and E then take the message and broadcast it further to terminals F and G, for example. Finally, the message reaches the DRM system which in response thereto broadcasts the key back to terminal A.

Thus, in a WLAN scenario, the present invention is equally well applicable and in such situation, the communication control functionality resides in the terminal.

Modification to the Embodiments

Furthermore, even though herein above different keys have been mentioned for e.g. different QoS, in a further modification it need not be different keys to be assigned. Rather, differences between functionalities (such as different QoS implemented) can be implemented by the help of different kind of rights which are attached as an attribute to the key as such. In other aspects, the invention will not differ from what has been disclosed herein before.

Furthermore, even though the present invention will in most cases be implemented as a programmed implementation, it is of course to be understood that it may be implemented as hardware within a terminal, e.g. in a separate tamper resistant device.

Accordingly, as has been described herein before, the present invention concerns a method for communication control in a communication network between a terminal (MS-A) originating communication and a communication destination (MS-B, DRM-GW), the communication network comprising at least one communication control entity (CC-SW), and a communication key management entity (DRM-KM), the method comprising the steps of: requesting communication by said terminal (A), determining at said at least one communication control entity (CC-SW) whether said communication request contains a valid communication key for communication in said network, and if no such valid key is contained, obtaining at least one valid key from said communication key management entity (DRM-KM) to be assigned to said requesting terminal (MS-A) for communication, performing communication of said requesting terminal (MS-A) to the communication destination using said communication key. Also, correspondingly adapted entities are subject of the present invention.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A method, comprising:
determining whether a valid communication key to communicate in the communication network is contained in a received communication request;
obtaining at least one valid communication key when the valid communication key is not within the communication request to be assigned to an originating terminal of said request to communicate when the valid communication key is not within the communication request; and
transmitting the determined valid communication key from the communication request or the obtained at least one valid communication key to the originating terminal to communicate with a destination using the transmitted communication key, wherein
the communication key is obtained based on a type of the communication requested between the destination and the originating terminal, and further based on quality of service parameters of the communication between the destination and the originating terminal.

2. The method according to claim 1, wherein the communication key comprises a pair of keys including an encryption key to encrypt data and a decryption key to decrypt encrypted data.

3. The method according to claim 2, wherein the determining further comprises forwarding the decryption key to said destination to decrypt received encrypted data.

4. The method according to claim 2, wherein the encrypted data is only partly encrypted.

5. The method according to claim 1, wherein the communication key has a predetermined expiry.

6. The method according to claim 5, wherein the communication key expires after a predetermined amount of data has been transmitted or received.

7. The method according to claim 5, wherein the communication key expires after a predetermined lifetime, wherein the predetermined lifetime starts when the communication key is assigned to the originating terminal.

8. The method according to claim 5, wherein the communication key expires either after a predetermined amount of data has been transmitted or received, or after a predetermined lifetime.

9. The method according to claim 5, wherein the communication key expires only after a predetermined amount of data has been transmitted or received, and after a predetermined lifetime.

10. The method according to claim 1, further comprising:
recording the at least one valid communication key at a communication key management entity; and
forwarding a recording event, based on the recording, to a billing entity enabled to bill the originating terminal based on a usage of the at least one valid communication key.

11. The method according to claim 1, further comprising:
enabling communication when the communication request is determined to be a valid communication request.

12. An apparatus, comprising:
a processor configured to
determine whether a received communication request contains a valid communication key to communicate in a network, obtain at least one valid communication key, to be assigned to a requesting terminal, when the communication request does not include the valid communication key, and initiate communication with a destination via the network using the determined valid communication key from the communication request or the obtained at least one valid communication key, wherein the processor is configured to obtain the communication key based on a type of the communication requested between the destination and the requesting terminal, and further based on quality of service parameters of the communication between the destination and the requesting terminal.

13. The apparatus according to claim 12, wherein the processor is further configured to initiate forwarding of the communication key to the requesting terminal, wherein the communication key comprises an encryption key and a decryption key.

14. The apparatus according to claim 13, wherein the processor is further configured to initiate forwarding of at least the decryption key to the destination.

15. The apparatus of claim 12, wherein the processor is further configured to enable communication when the communication request is determined to be a valid communication request.

16. An apparatus, comprising:
a first interface, configured to interface with a communication control functionality, wherein the first interface is configured to receive, as an input, a key obtaining request to obtain at least one valid communication key and wherein the first interface is configured to transmit, as an output, the at least one valid communication key; and a second interface, configured to interface with a billing entity and configured to transmit, as an output, a record comprising at least an identification of a requesting terminal, assigned communication keys, and usage parameters of said at least one communication key, wherein the communication key is obtained based on a type of the communication requested between the destination and the requesting terminal, and further based on quality of service parameters of the communication between the destination and the requesting terminal.

17. The apparatus according to claim 16, wherein the communication key comprises a pair of keys including an encryption key to encrypt data and a decryption key to decrypt encrypted data.

18. The apparatus according to claim 16, wherein the communication key has a predetermined expiry.

19. The apparatus according to claim 18, wherein the communication key expires after a predetermined amount of data has been transmitted or received.

20. An apparatus, comprising:
a processor configured to
include, into a communication request, an indication of assigned communication keys, and initiate transmission of the communication request to a communication control functionality, wherein a received communication key to be assigned to a requesting terminal for communication is obtained based on a type of communication requested between a destination and the requesting terminal, and further based on quality of service parameters of the communication between the destination and the requesting terminal.

21. The apparatus according to claim 20, wherein the processor is configured to initiate bidirectional communication with a destination via the communication network using an encryption key to send and a decryption key to receive communication data to and from said destination.

22. An apparatus, comprising:
a processor configured to
initiate bidirectional communication with a destination located in a second network using an encryption key to send and a decryption key to receive communication data to and from a requesting terminal; and initiate relaying of the communication data in a non-encrypted format to and from the destination, wherein a received communication key to be assigned to a requesting terminal for communication is obtained based on a type of the communication requested between the destination and the requesting terminal, and further based on quality of service parameters of the communication between the destination and the requesting terminal.

23. The apparatus according to claim 22, wherein the communication key comprises a pair of keys including an encryption key to encrypt data and a decryption key to decrypt encrypted data.

24. The apparatus according to claim 22, wherein the communication key has a predetermined expiry.

25. The apparatus according to claim 24, wherein the communication key expires after a predetermined amount of data has been transmitted or received.

26. A system, comprising:
at least one terminal comprising
a receiver configured to receive a communication key to be assigned to a requesting terminal to communicate, a processor configured to include, into a communication request, an indication of assigned communication keys, and a transmitter configured to transmit a communication request to a communication control entity;

at least one communication control entity comprising
a receiver configured to receive the communication request from the requesting terminal, a processor configured to determine whether the communication request contains a valid communication key to communicate in a network, and to obtain at least one valid communication key from a communication key management entity, to be assigned to the requesting terminal, when the communication request does not include the valid communication key, and a transmitter configured to communicate with a destination via the network using the determined valid communication key from the communication request or the obtained at least one valid communication key, wherein the processor is configured to enable communication when the communication request is determined to be a valid communication request; and a communication key management entity comprising
a first interface, configured to interface with a communication control functionality, wherein the first interface is configured to receive, as an input from the communication control functionality, a key obtaining request to obtain at least one valid communication key from a communication key management entity, and wherein the first interface is configured to transmit, as an output to the communication control functionality, the at least one valid communication key, and a second interface, configured to interface with a billing entity and configured to transmit, as an output to the billing entity, a record comprising at least an identification of a requesting terminal, assigned communication keys, and usage parameters of said at least one key, wherein the processor is configured to obtain the communication key based on a type of the communication requested between the destination and the requesting terminal, and further based on quality of service parameters of the communication between the destination and the requesting terminal.

27. A computer program embodied on a computer readable storage medium, the computer program comprising program code configured to control a processor to perform a process, the process comprising:

determining, at one of at least one communication control functionality, whether a valid communication key to communicate in the communication network is contained in a received communication request from an originating terminal;

obtaining least one valid communication key from a communication key management entity to be assigned to the requesting terminal when the communication request does not include the valid communication key; and transmitting the determined valid communication key from the communication request or the obtained at least one valid communication key to communicate with a destination using the transmitted communication key, wherein the communication key is obtained based on a type of the communication requested between the destination and the originating terminal, and further based on quality of service parameters of the communication between the destination and the originating terminal.

28. A method, comprising:

determining whether a received communication request contains a valid communication key to communicate in a network;

obtaining at least one valid communication key to be assigned to a requesting terminal when the communication request does not include the valid communication key; and enabling communication of the requesting terminal with a destination via the network using the determined valid communication key from the communication request or the obtained at least one valid communication key, wherein the communication key is obtained based on a type of the communication requested between the destination and the requesting terminal, and further based on quality of service parameters of the communication between the destination and the requesting terminal.

29. The method according to claim 28, further comprising:

forwarding the communication key to the requesting terminal, wherein the communication key comprises an encryption key and a decryption key.

30. The method according to claim 29, wherein the forwarding forwards at least the decryption key to the destination.

31. The method of claim 28, further comprising:

enabling communication when the communication request is determined to be a valid communication request.

32. A method, comprising:

receiving, as an input, a key obtaining request to obtain at least one valid communication key;

transmitting, as an output, the at least one valid communication key; and transmitting, as an output, a record comprising at least an identification of a requesting terminal, assigned communication keys, and usage parameters of said at least one valid communication key, wherein the communication key is obtained based on a type of communication requested between a destination and the requesting terminal, and further based on quality of service parameters of the communication between the destination and the requesting terminal.

33. The method according to claim 32, wherein the communication key comprises a pair of keys including an encryption key to encrypt data and a decryption key to decrypt encrypted data.

34. The method according to claim 32, wherein the communication key has a predetermined expiry.

35. The method according to claim 34, wherein the communication key expires after a predetermined amount of data has been transmitted or received.

36. An apparatus, comprising:

determination means for determining whether a received communication request contains a valid communication key for communicating in a network;

obtaining means for obtaining at least one valid communication key from a communication key management entity, to be assigned to a requesting terminal, when the communication request does not include the valid communication key; and communication means for communicating with a destination via the network using the determined valid communication key from the communication request or the obtained at least one valid communication key, wherein the obtaining means is configured to obtain the communication key based on a type of the communication requested between the destination and the requesting terminal, and further based on quality of service parameters of the communication between the destination and the requesting terminal.

37. An apparatus, comprising:

communication means for performing bidirectional communication with a destination located in a second network using an encryption key for sending and a decryption key for receiving communication data to and from a requesting terminal; and relaying means for relaying the communication data in a non-encrypted format to and from the destination, wherein a received communication key assigned to a requesting terminal for communication is obtained based on a type of the communication requested between the destination and the requesting terminal, and further based on quality of service parameters of the communication between the destination and the requesting terminal.

38. An apparatus, comprising:

first interface means for interfacing with a communication control functionality, wherein the first interface means is configured to receive, as an input, a key obtaining request for obtaining at least one valid communication key, and wherein the first interface means is configured to transmit, as an output, the at least one valid communication key; and second interface means for interfacing with a billing entity and configured to transmit, as an output, a record comprising at least an identification of a requesting terminal, assigned communication keys, and usage parameters of said at least one communication key, wherein the communication key is obtained based on a type of communication requested between a destination and the requesting terminal, and further based on quality of service parameters of the communication between the destination and the requesting terminal.

39. An apparatus, comprising:
processing means for including, into a communication request, an indication of assigned communication keys; and
transmission means for transmitting the communication request to a communication control functionality, wherein
a received communication key to be assigned to a requesting terminal for communication is obtained based on a type of communication requested between a destination and the requesting terminal, and further based on quality of service parameters of the communication between the destination and the requesting terminal.

40. A method, comprising:
including, into a communication request, and indication of assigned communication keys; and
transmitting the communication request to a communication control functionality, wherein
a received communication key assigned to a requesting terminal for communication is obtained based on a type of the communication requested between the destination and the requesting terminal, and further based on quality of service parameters of the communication between the destination and the requesting terminal.

41. The method according to claim 40, wherein the communication key comprises a pair of keys including an encryption key to encrypt data and a decryption key to decrypt encrypted data.

42. The method according to claim 40, wherein the communication key has a predetermined expiry.

43. The method according to claim 42, wherein the communication key expires after a predetermined amount of data has been transmitted or received.

44. A method, comprising:
performing bidirectional communication with a destination located in a second network using an encryption key to send and a decryption key to receive communication data to and from the requesting terminal; and
relaying the communication data in a non-encrypted format to and from the destination, wherein
a received communication key assigned to a requesting terminal for communication is obtained based on a type of the communication requested between the destination and the requesting terminal, and further based on quality of service parameters of the communication between the destination and the requesting terminal.

45. The method according to claim 44, wherein the communication key comprises a pair of keys including an encryption key to encrypt data and a decryption key to decrypt encrypted data.

46. The method according to claim 44, wherein the communication key has a predetermined expiry.

47. The method according to claim 46, wherein the communication key expires after a predetermined amount of data has been transmitted or received.

* * * * *

UNITED STATES PATENT AND TRADEMARK OFFICE
CERTIFICATE OF CORRECTION

PATENT NO.         : 7,571,469 B2
APPLICATION NO.    : 10/411362
DATED              : August 4, 2009
INVENTOR(S)        : Hamberg It is certified that error appears in the above-identified patent and that said Letters Patent is hereby corrected as shown below:

In Claims delete col. 10 line 7-thru col. 16 line 28, and substitute the attached claims.

Claims as listed in Examiner's Amendment with the Notice of Allowability

1. A method, comprising:
determining whether a DETERMINED REQUEST key to communicate in the communication network is contained in a received communication request; obtaining at least one OBTAINED VALIDATION key when the DETERMINED REQUEST key is not within the communication request to be assigned to an originating terminal of said request to communicate when the DETERMINED REQUEST key is not within the communication request; and transmitting the determined DETERMINED REQUEST key from the communication request or the obtained at least one OBTAINED VALIDATION key to the originating terminal to communicate with a destination using this TRANSMITTED communication key, wherein
the OBTAINED VALIDATION key is obtained based on a type of the communication requested between the destination and the originating terminal, and further based on quality of service parameters of the communication between the destination and the originating terminal.

2. The method according to claim 1, wherein the TRANSMITTED communication key comprises a pair of keys including an encryption key to encrypt data and a decryption key to decrypt encrypted data.

3. The method according to claim 1, wherein the TRANSMITTED communication key has a predetermined expiry.

4. The method according to claim 3, wherein the TRANSMITTED communication key expires after a predetermined amount of data has been transmitted or received.

5. The method according to claim 3, wherein the TRANSMITTED communication key expires after a predetermined lifetime, wherein the predetermined lifetime starts when the TRANSMITTED communication key is assigned to the originating terminal.

6. The method according to claim 3, wherein the TRANSMITTED communication key expires either after a predetermined amount of data has been transmitted or received, or after a predetermined lifetime.

7. The method according to claim 3, wherein the TRANSMITTED communication key expires only after a predetermined amount of data has been transmitted or received, and after a predetermined lifetime.

8. (Cancelled previously)

9. (Cancelled previously)

10. The method according to claim 2, wherein the determining further comprises forwarding the decryption key to said destination to decrypt received encrypted data.

11. The method according to claim 1, further comprising: recording the at least one OBTAINED VALIDATION key at a communication key management entity; and forwarding a recording event, based on the recording, to a billing entity enabled to bill the originating terminal based on a usage of the at least one OBTAINED VALIDATION key.

12. An apparatus, comprising:
a processor configured to determine whether a received communication request contains a DETERMINED REQUEST key to communicate in a network, obtain at least one OBTAINED VALIDATION key, to be assigned to a requesting terminal, when the communication request does not include the DETERMINED REQUEST key; and
initiate communication with a destination via the network using the determined DETERMINED REQUEST key from the communication request or the obtained at least one OBTAINED VALIDATION key, wherein
the processor is configured to obtain the OBTAINED VALIDATION key based on a type of the communication requested between the destination and the requesting terminal, and further based on quality of service parameters of the communication between the destination and the requesting terminal.

13. The apparatus according to claim 12, wherein the processor is further configured to initiate forwarding of the OBTAINED VALIDATION key to the requesting terminal, wherein the OBTAINED VALIDATION key comprises an encryption key and a decryption key.

14. The apparatus according to claim 13, wherein the processor is further configured to initiate forwarding of at least the decryption key to the destination.

15. An apparatus, comprising:

a first interface, configured to interface with a communication control functionality, wherein the first interface is configured to receive, as an input, a key obtaining request to obtain at least one OBTAINED VALIDATION key and wherein the first interface is configured to transmit, as an output, the at least one OBTAINED VALIDATION key; and a second interface, configured to interface with a billing entity and configured to transmit, as an output, a record comprising at least an identification of a requesting terminal, DETERMINED REQUEST keys, and usage parameters of said at least OBTAINED VALIDATION key, wherein the OBTAINED VALIDATION key is obtained based on a type of the communication requested between the destination and the requesting terminal, and further based on quality of service parameters of the communication between the destination and the requesting terminal.

16. An apparatus, comprising:

a processor configured to include, into a communication request, an indication of DETERMINED REQUEST keys; and initiate transmission of the communication request to a communication control functionality, wherein a RECEIVED communication key to be assigned to a requesting terminal for communication is obtained based on a type of communication requested between a destination and the requesting terminal, and further based on quality of service parameters of the communication between the destination and the requesting terminal.

17. The apparatus according to claim 16, wherein the processor is configured to initiate bidirectional communication with a destination via the communication network using an encryption key to send and a decryption key to receive communication data to and from said destination.

18. An apparatus, comprising:

a processor configured to initiate bidirectional communication with a destination located in a second network using an encryption key to send and a decryption key to receive communication data to and from a requesting terminal; and initiate relaying of the communication data in a non-encrypted format to and from the destination, wherein a RECEIVED communication key to be assigned to a requesting terminal for communication is obtained based on a type of the communication requested between the destination and the requesting terminal, and further based on quality of service parameters of the communication between the destination and the requesting terminal.

19. The method according to claim 2, wherein the encrypted data is only partly encrypted.

20. The method according to claim 1, further comprising:

enabling communication when the communication request is determined to be a valid communication request.

21. The apparatus of claim 12, wherein the processor is further configured to enable communication when the communication request is determined to be a valid communication request.

22. A system, comprising: at least one terminal comprising a receiver configured to receive a communication key to be assigned to a requesting terminal to communicate, a processor configured to include, into a communication request, an indication of DETERMINED REQUEST keys, and a transmitter configured to transmit a communication request to a communication control entity; at least one communication control entity comprising a receiver configured to receive the communication request from the requesting terminal, a processor configured to determine whether the communication request contains a DETERMINED REQUEST key to communicate in a network, and to obtain at least one OBTAINED VALIDATION key from a communication key management entity, to be assigned to the requesting terminal, when the communication request does not include the DETERMINED REQUEST key, and a transmitter configured to communicate with a destination via the network using the determined valid communication key from the communication request or the obtained at least one OBTAINED VALIDATION key, wherein the processor is configured to enable communication when the communication request is determined to be a valid communication request; and a communication key management entity comprising a first interface, configured to interface with a communication control functionality, wherein the first interface is configured to receive, as an input from the communication control functionality, a key obtaining request to obtain at least one OBTAINED VALIDATION key from a communication key management entity, and wherein the first interface is configured to transmit, as an output to the communication control functionality, the at least one OBTAINED VALIDATION key, and a second interface, configured to interface with a billing entity and configured to transmit, as an output to the billing entity, a record comprising at least an identification of a requesting terminal, assigned communication keys, and usage parameters of said at least one OBTAINED VALIDATION key, wherein the processor is configured to obtain the OBTAINED VALIDATION key based on a type of the communication requested between the destination and the requesting terminal, and further based on quality of service parameters of the communication between the destination and the requesting terminal.

23. A computer program embodied on a computer readable storage medium, the computer program comprising program code configured to control a processor to perform a process, the process comprising:

determining, at one of at least one communication control functionality, whether a DETERMINED REQUEST key to communicate in the communication network is contained in a received communication request from an originating terminal; obtaining at least one OBTAINED VALIDATION key from a communication key management entity to be assigned to the requesting terminal when the communication request does not include the DETERMINED REQUEST key; and transmitting the determined DETERMINED REQUEST key from the communication request or the obtained at least one OBTAINED VALIDATION key to communicate with a destination using this TRANSMITTED communication key, wherein the OBTAINED VALIDATION key is obtained based on a type of the communication requested between the destination and the originating terminal, and further based on quality of service parameters of the communication between the destination and the originating terminal.

24. A method, comprising:

determining whether a received communication request contains a DETERMINED REQUEST key to communicate in a network;

obtaining at least one OBTAINED VALIDATION key to be assigned to a requesting terminal when the communication request does not include the DETERMINED REQUEST; and enabling communication of the requesting terminal with a destination via the network using the determined DETERMINED REQUEST from the communication request or the obtained at least one OBTAINED VALIDATION key, wherein the OBTAINED VALIDATION key is obtained based on a type of the communication requested between the destination and the requesting terminal, and further based on quality of service parameters of the communication between the destination and the requesting terminal.

25. The method according to claim 24, further comprising:

forwarding the OBTAINED VALIDATION key to the requesting terminal, wherein the communication key comprises an encryption key and a decryption key.

26. The method according to claim 25, wherein the forwarding forwards at least the decryption key to the destination.

27. The method of claim 24, further comprising:

enabling communication when the communication request is determined to be a valid communication request.

28. A method, comprising:

receiving, as an input, a key obtaining request to obtain at least OBTAINED VALIDATION key; transmitting, as an output, the at least one OBTAINED VALIDATION key; and transmitting, as an output, a record comprising at least an identification of a requesting terminal, DETERMINED REQUEST keys, and usage parameters of said at least one OBTAINED VALIDATION key, wherein the OBTAINED VALIDATION key is obtained based on a type of communication requested between a destination and the requesting terminal, and further based on quality of service parameters of the communication between the destination and the requesting terminal.

29. An apparatus, comprising:

determination means for determining whether a received communication request contains a DETERMINED REQUEST key for communicating in a network;

obtaining means for obtaining at least one OBTAINED VALIDATION key from a communication key management entity, to be assigned to a requesting terminal, when the communication request does not include the DETERMINED REQUEST key; and communication means for communicating with a destination via the network using the determined DETERMINED REQUEST key from the communication request or the obtained at least one OBTAINED VALIDATION key, wherein the obtaining means is configured to obtain the OBTAINED VALIDATION key based on a type of the communication requested between the destination and the requesting terminal, and further based on quality of service parameters of the communication between the destination and the requesting terminal.

30. An apparatus, comprising:

communication means for performing bidirectional communication with a destination located in a second network using an encryption key for sending and a decryption key for receiving communication data to and from a requesting terminal; and relaying means for relaying the communication data in a non-encrypted format to and from the destination, wherein a RECEIVED communication key assigned to a requesting terminal for communication is obtained based on a type of the communication requested between the destination and the requesting terminal, and further based on quality of service parameters of the communication between the destination and the requesting terminal.

31. An apparatus, comprising:

first interface means for interfacing with a communication control functionality, wherein the first interface means is configured to receive, as an input, a key obtaining request for obtaining at least one OBTAINED VALIDATION key, and wherein the first interface means is configured to transmit, as an output, the at least one OBTAINED VALIDATION key; and second interface means for interfacing with a billing entity and configured to transmit, as an output, a record comprising at least an identification of a requesting terminal, assigned keys, and usage parameters of said at least one OBTAINED VALIDATION key, wherein the OBTAINED VALIDATION key is obtained based on a type of communication requested between a destination and the requesting terminal, and further based on quality of service parameters of the communication between the destination and the requesting terminal.

32. An apparatus, comprising:

processing means for including, into a communication request, an indication of DETERMINED REQUEST keys that have been assigned; and transmission means for transmitting the communication request to a communication control functionality, wherein a received DETERMINED REQUEST key to be assigned to a requesting terminal for communication is obtained based on a type of communication requested between a destination and the requesting terminal, and further based on quality of service parameters of the communication between the destination and the requesting terminal.

33. A method, comprising:

including, into a communication request, an indication of DETERMINED REQUEST keys that have been assigned; and transmitting the communication request to a communication control functionality, wherein a received DETERMINED REQUEST key to be assigned to a requesting terminal for communication is obtained based on a type of communication requested between a destination and the requesting terminal, and further based on quality of service parameters of the communication between the destination and the requesting terminal.

34. A method, comprising:

performing bidirectional communication with a destination located in a second network using an encryption key to send and a decryption key to receive communication data to and from the requesting terminal; and relaying the communication data in a non-encrypted format to and from the destination, wherein a RECEIVED communication key assigned to a requesting terminal for communication is obtained based on a type of the communication requested between the destination and the requesting terminal, and further based on quality of service parameters of the communication between the destination and the requesting terminal.

35. The apparatus according to claim 15, wherein the OBTAINED VALIDATION key comprises a pair of keys including an encryption key to encrypt data and a decryption key to decrypt encrypted data.

36. The apparatus according to claim 15, wherein the OBTAINED VALIDATION key has a predetermined expiry.

37. The apparatus according to claim 36, wherein the OBTAINED VALIDATION key expires after a predetermined amount of data has been transmitted or received.

38. The apparatus according to claim 18, wherein the RECEIVED communication key comprises a pair of keys including an encryption key to encrypt data and a decryption key to decrypt encrypted data.

39. The apparatus according to claim 18, wherein the RECEIVED communication key has a predetermined expiry.

40. The apparatus according to claim 39, wherein the RECEIVED communication key expires after a predetermined amount of data has been transmitted or received.

41. The method according to claim 28, wherein the OBTAINED VALIDATION key comprises a pair of keys including an encryption key to encrypt data and a decryption key to decrypt encrypted data.

42. The method according to claim 28, wherein the OBTAINED VALIDATION key has a predetermined expiry.

43. The method according to claim 42, wherein the OBTAINED VALIDATION key expires after a predetermined amount of data has been transmitted or received.

44. The method according to claim 33, wherein the DETERMINED REQUEST key comprises a pair of keys including an encryption key to encrypt data and a decryption key to decrypt encrypted data.

45. The method according to claim 33, wherein the DETERMINED key has a predetermined expiry.

46. The method according to claim 45, wherein the RECEIVED communication key expires after a predetermined amount of data has been transmitted or received.

47. The method according to claim 34, wherein the RECEIVED communication key comprises a pair of keys including an encryption key to encrypt data and a decryption key to decrypt encrypted data.

48. The method according to claim 34, wherein the RECEIVED communication key has a predetermined expiry.

49. The method according to claim 48, wherein the RECEIVED communication key expires after a predetermined amount of data has been transmitted or received.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,571,469 B2
APPLICATION NO. : 10/411362
DATED : August 4, 2009
INVENTOR(S) : Max Hamberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Seventh Day of September, 2010

David J. Kappos
*Director of the United States Patent and Trademark Office*